United States Patent [19]

Danuser

[11] 3,732,022
[45] May 8, 1973

[54] VIBRATORY COMPACTOR

[76] Inventor: John Henry Danuser, c/o Danuser Machine Company, 500 East 3rd Street, Fulton, Mo.

[22] Filed: Nov. 8, 1971

[21] Appl. No.: 196,637

[52] U.S. Cl. .......................... 404/133, 404/133
[51] Int. Cl. ................................ E01c 19/30
[58] Field of Search ........................ 94/48, 49, 50 V

[56] References Cited

UNITED STATES PATENTS

| | | | |
|---|---|---|---|
| 2,154,207 | 4/1939 | Jackson | 94/48 |
| 2,542,979 | 2/1951 | Barnes | 94/48 |
| 2,646,729 | 7/1953 | Godenir | 94/48 |
| 2,677,995 | 5/1954 | Wood | 94/48 |
| 2,921,475 | 1/1960 | Kindler | 94/48 X |
| 3,001,458 | 9/1961 | Croucher | 94/48 |
| 3,052,166 | 9/1962 | Thrun | 94/48 |
| 3,199,424 | 8/1965 | Glass | 94/48 |
| 3,283,677 | 11/1966 | Uebel | 94/48 |
| 3,396,642 | 8/1968 | Martinson | 94/39 |

Primary Examiner—Nile C. Byers, Jr.
Attorney—Colin, Powell & Hind

[57] ABSTRACT

This compactor includes a compacting shoe carrying a fixed housing mounting a vibration inducing shaft. The shoe is resiliently mounted to a carrier frame and a gearbox pivotally mounted to the carrier frame transmits power to the vibration shaft by means of a flexible belt assembly. The flexible belt is tensioned by means of an adjustable arm, which extends between the gearbox housing and the vibration shaft housing and is disposed on the center line between driver and driven elements of the flexible drive assembly. The arm is pivotally connected at one end to the gearbox housing and resiliently connected at the other end to the vibration shaft housing.

10 Claims, 5 Drawing Figures

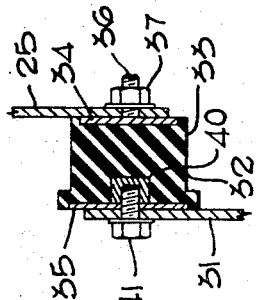
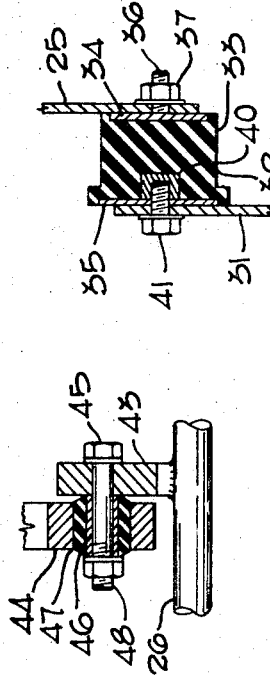
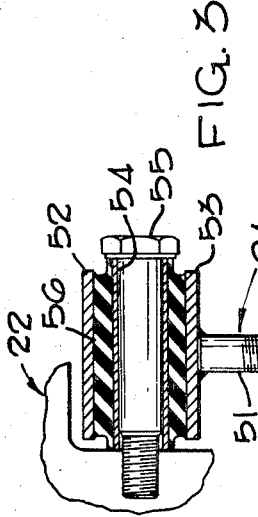
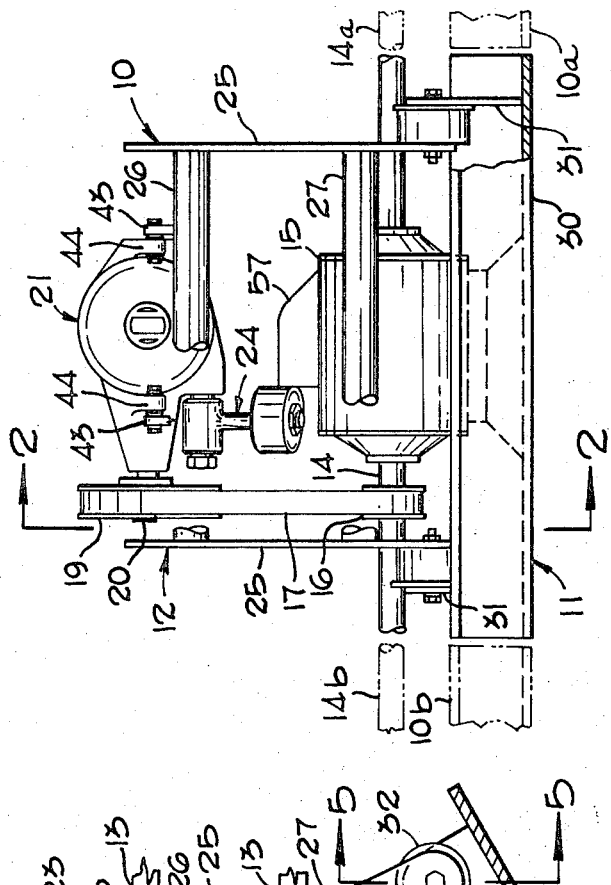
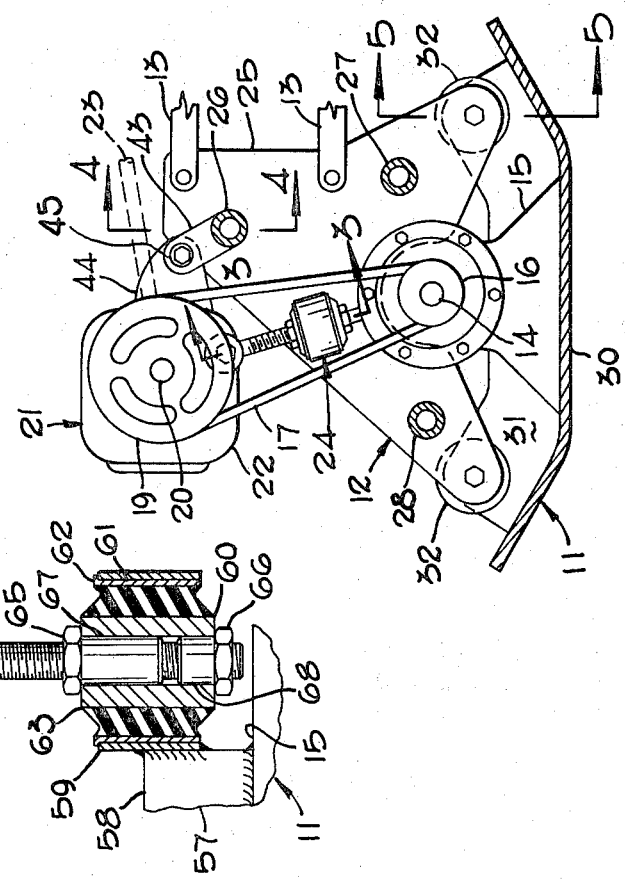

VIBRATORY COMPACTOR

BACKGROUND OF THE INVENTION

This invention relates generally to a vibratory compacting machine of the type utilizing a flexible element to drive the vibration mechanism and particularly to a device for tensioning the flexible drive element.

Vibrating compaction machines for consolidating material such as sand, road metal, rubble or gravel mixtures have been used for many years in road work. They are usually provided as a compactor attachment mounted to a vehicle, such as a truck or tractor.

In general, such compactors of the type under consideration consist of heavy shoes, which are vibrated by means of rotating eccentrics mounted to the shoes. The necessary drive power to rotate the shaft is usually provided by the vehicle mounting the device, through the medium of a gearbox and a continuous flexible belt drive extending between the gearbox and the shaft. Flexible drives of this type are efficient provided that some form of belt tensioning device is utilized. When the gearbox is mounted in substantially fixed relation to the shoe tensioning of the flexible belt element may be achieved by conventional spring loaded belt engaging tensioners mounted adjacent the belt. However, if the centers of rotation of the drive sheave and the driven sheave experience displacement resulting from the structural relationship of vibrating parts conventional tensioners are not satisfactory, particularly over a wide range of vibration. For example, a tensioner which is effective in a low frequency range is commonly much less effective in a high frequency range and vice versa. Moreover, initial belt adjustment is not easily achieved with conventional belt tensioners of the type employing an idler sheave.

SUMMARY OF THE INVENTION

This compactor utilizes a flexible drive which is efficient over a wide range of vibration frequencies because of the unique belt tensioning device. The system is essentially self-dampening in the presence of normal vibratory frequencies.

The tensioning device maintains relatively constant belt tension without the use of weights or constant force springs and no idler sheave is necessary.

Further, the device achieves a simple and highly effective method of initial belt adjustment by providing a lengthwise adjustable arm between the centers of rotation of the driver and driven sheaves.

The compactor includes shoe means and carrier frame means resiliently mounted to the shoe means. A vibrator means is carried by the shoe means and includes a housing, fixedly mounted to the shoe means, and a vibration inducing shaft which is mounted to the housing and provided with a rotatable driven element. Drive means is carried by the carrier frame and includes a housing, pivotally and resiliently mounted to the carrier frame means, and a drive shaft, the drive shaft being mounted to the housing and provided with a rotatable driver element. A continuous element extends between the driver element and the driven element.

Tensioning means is provided for tensioning the flexible element including an adjustable arm disposed substantially on the center line between the driver and driven elements. The tensioning means is pivotally connected at one end to the drive housing and resiliently connected at the other end to the vibrator housing. The pivotal mounting includes a resiliently mounted transverse pivot bolt, and the resilient means includes inner and outer rigid sleeves and an intermediate resilient sleeve. The sleeves are coaxially disposed of the adjustable arm, and the vibrator housing includes a fixed support collar receiving the outer sleeve in coaxial relation. The adjustable arm includes a threaded shank having spaced locking elements disposed thereon and the inner sleeve is locked in clamped relation between said locking elements.

BRIEF DESCRIPTION OF THE DRAWING

FIG. 1 is an elevational view of a compactor unit including the belt tensioner;

FIG. 2 is a sectional view taken on line 2—2 of FIG. 1;

FIG. 3 is a sectional view of the belt tensioner taken on line 3—3 of FIG. 2;

FIG. 4 is a sectional view of the gearbox housing pivot mounting taken on line 4—4 of FIG. 2; and FIG. 5 is a sectional view of the resilient mounting between the carrier frame and the shoe taken on line 5—5 of FIG. 2.

DESCRIPTION OF THE PREFERRED EMBODIMENT:

Referring now by characters of reference to the drawing and first to FIGS. 1 and 2 it will be understood that the compactor unit generally indicated by numeral 10 is one of a plurality of such units, three in number in the preferred embodiment. The center compactor unit 10 and the flanking compactor units 10a and 10b are substantially similar in that each includes a shoe 11 subjacently mounted to a carrier frame 12, said shoe and frame constituting a compactor framing means. The carrier frame 12 of the center compactor unit 10 is carried by a transporting vehicle (not shown) by means of hitch elements 13. The vibrator means for the compactor unit 10, in the preferred embodiment, includes a shaft 14 having a small driven sheave 15 at one end and mounting a plurality of eccentrics (not shown) within a housing 16. The small sheave 15 is rotated by drive means including a continuous flexible belt 17 driven by a relatively large sheave 19 mounted to the drive shaft 20 of a gearbox 21. The gearbox 21 includes a gearbox drive housing 22 pivotally mounted to the carrier frame 14 and is powered by a universally coupled transmission shaft 23. In the preferred embodiment the transmission shaft 23 is driven by the transporting vehicle. A belt tensioner generally indicated by numeral 24 extends between the gearbox housing 21 and the vibrator housing 16 and supports the pivot gearbox housing 22.

The drive means provided for the center compactor unit 10 also provides the power necessary to vibrate the flanking compactor units 10a and 10b. To this end these flanking compactor units are provided with shafts 14a and 14b, which are universally coupled to the eccentric shaft 14 of the center compactor unit 10. Except for the drive means and the hitch means the compactor units 10, 10a and 10b are essentially similar in construction.

The carrier frame 12 includes opposed side plates 25 which are connected by an upper transverse strut 26 and a pair of lower transverse struts 27 and 28. The struts 26, 27 and 28 are rigidly connected between the side plates 25 as by welding. The shoe 11 includes a base plate 30 and a pair of stiffener plates 31 and the carrier frame 12 is resiliently mounted to the shoe 11 by means of a plurality of rubber mounts 32, which extend between the side plates 25 and stiffener plates 31 as indicated in FIG. 5. Each rubber mount 32 includes a solid rubber body 33 having flange plates 34 and 35 bonded thereto. Flange plate 34 includes a projecting stud 36, which is connected to the carrier frame side plate 25 by means of a nut and washer connection 37. Flange plate 35 is provided with a threaded center socket portion 40 by which the rubber mount 32 is bolted to the shoe stiffener plate 31 by means of a bolt and washer connection 41. By virtue of the rubber mounts 32 the carrier frame 12 in the preferred embodiment can move radially in any direction about the center line of said rubber mounts.

The gearbox housing 22, which constitutes a drive housing, is pivotally connected to the carrier frame 12 by means of a rubber mount pivotal connection which is clearly shown in FIG. 4. The upper transverse strut 26 extending between the side plates 25 includes a pair of spaced projecting lugs 43, which are attached to said strut 26 as by welding. The gear box housing 22 includes a pair of spaced wing lugs 44 adjacently disposed of associated projecting lugs 43 and adjacent lugs 43 and 44 are pivotally connected by a resiliently mounted pivot bolt 45, which extends through the sleeve 46 of a rubber mount 47, by means of a nut and washer connection 48. This resilient pivot connection permits the gearbox a small amount of radial movement and considerable angular movement about the axis of rotation of the gearbox mounts. The angular movement is limited by the tensioner 24 which in effect provides a resilient supporting strut as illustrated in some detail in FIG. 3.

The tensioner 24 provides an arm means located substantially on the mean center line between the rotational axes of the sheaves 16 and 19 as clearly shown in FIG. 2. As shown in FIG. 3, the tensioner 24 includes an elongate threaded shank 51, constituting an adjustable arm, and having a pivotal mounting 52 at the upper end connected to the gearbox housing 22 and a resilient mounting 60 at the lower end connected to the vibrator housing 15. The pivotal mounting 52 includes a transverse outer sleeve 53, which is welded to the shank 41, and an inner sleeve 54 which receives a pivot bolt 55 threadedly connected to the gearbox housing 22. An intermediate resilient sleeve 56, is bonded between said outer and inner sleeves 53 and 54 respectively to provide a cushioned pivotal connection. The vibrator housing 15 includes a support 57 welded to said housing, the support including an upwardly projecting lug 58 having a collar 59 welded, or otherwise attached thereto, and the resilient mounting 60, which is coaxially disposed about the shank 41, is received within said collar 59. As shown in FIG. 3 the resilient mounting 60 includes an outer sleeve 61 having a marginal seating lip 62 engaging the rim of the collar 59; an inner sleeve 63; and an intermediate resilient sleeve 64 bonded between said inner and outer sleeves. The shank 51 includes a pair of spaced lock nuts 65 and 66, which are threadedly movable along the length of said shank. The lock nuts 65 and 66 include body portions 67 and 68 respectively which have a combined length shorter than the length of the inner sleeve 63 within which they are slidably received to facilitate the locking action.

It will be understood that the effective length of the tensioner 24 may be adjusted by moving the appropriate lock nut until the desired length is achieved and then locking the shank 51 to the inner sleeve 63 by means of the other lock nut. By virtue of the transverse resilient sleeve 56 at the upper end of the shank 51, and the coaxial resilient sleeve 64 at the lower end of the shank 51 a degree of relative movement between the axes of rotation of driver and driven sheaves 16 and 19 is possible during the vibratory compacting operation. Further, the shank length adjustment feature permits initial tensioning of the belt 17 to be achieved by manipulation of the lock nuts 65 and 66.

It is thought that the structural features and functional advantages of this compactor and tensioning device have become fully apparent from the foregoing description of parts but for completeness of disclosure the operation of the device will be briefly summarized.

The carrier frame 12 is connected to the compactor shoe 11 by four rubber mounts 32 and this resilient connection permits differential movement between said frame and shoe. The gearbox 21 is pivotally connected to the carrier frame 12 by a pair of resiliently mounted pivot bolts 45, which provide the gearbox 22 with a swinging capability about said bolts and, in addition, a degree of radial movement. The tensioner strut 24, which extends between the gearbox housing 22 and the vibrator housing 15 supports said gearbox and limits the swinging action. In effect, the tensioner arm 24 provides a cushioned support for the gearbox 22.

The tensioner 24 is installed by inserting the resilient mounting outer sleeve 61 at the lower end within the support collar 59 and pivotally connecting the upper end to the gearbox housing 22. The tensioner shank 51 may be adjusted to correct length to provide the belt 17 with the desired tension by suitable positioning of the lock nuts 65 and 66.

The compacting operation is performed in the preferred embodiment by virtue of eccentrics mounted on the shaft 14 which cause the shoe 11 to vibrate at a frequency which is dependent on the rotational speed of such shaft. The precise behavior of the compacting unit 10 under vibration conditions depends on several factors, in addition to the rotational speed of the shaft. These factors include the weight of the individual components and the manner of mounting said components. The disposition of the tensioner 24 substantially on the center line between the driver and driven sheaves 16 and 19 and the structural arrangement of parts of said tensioner is such that major low frequency movement of the shoe 11 and the small sheave 16 is transmitted through the tensioner 24 to the large sheave 20 and the gearbox 22, causing said gearbox to pivot about its mount. The center to center distance between the sheaves under low frequency conditions is substantially maintained. On the other hand relatively small magnitude, high frequency movements of the shoe 11 and small sheave 16, for example of the order of 0.1 inch total movement at 3,000 cycles per minute, are substantially absorbed in the lower resilient mounting 60 and the upper resilient pivotal mounting and cause no appreciable variation in the center to center distance between the sheaves. Thus, at most speeds within a wide range there is little or no undesirable belt vibration. Further, with the arrangement shown in the preferred embodiment the system has been found to have self-dampening characteristics at normal working frequencies.

I claim as my invention:

1. In a compactor:
   a. compactor framing means including a carrier frame means and shoe means,
   b. vibrator means including:
      1. housing means mounted to the shoe means,
      2. vibration inducing shaft means mounted to the housing means and including a rotatable driven element,
   c. drive means including:
      1. housing means pivotally mounted to the compactor framing means,
      2. drive shaft means mounted to the housing means and including a rotatable drive element, and
      3. a continuous flexible element extending between the drive element and the driven element in drive relation,
   d. means tensioning the flexible elements including:
      1. arm means including opposed ends, one of said ends being connected to the drive housing and the other of said ends being connected to the vibrator housing,
      2. pivot means pivotally connecting one of said ends to one of said housings,
      3. resilient means resiliently connecting the other of said ends to the other of said housings, and
      4. adjustment means adjusting the length of the arm.

2. A compactor as defined in claim 1, in which:
   e. the pivot means connects the arm means to the drive housing, and
   f. the resilient means connects the arm means to the vibrator housing.

3. A compactor as defined in claim 2, in which:
   g. the pivot means includes a pin transversely disposed of the arm means and resiliently mounted to said arm means.

4. A compactor as defined in claim 1, in which:
   e. the resilient means includes an inner sleeve, an outer sleeve and an intermediate sleeve of resilient material bonded between said inner and outer sleeves.

5. A compactor as defined in claim 4, in which:
   f. the vibrator housing includes a support means, and
   g. the support means includes a collar coaxially supporting said outer sleeve.

6. A compactor as defined in claim 1, in which:
   e. the pivot means pivotally connecting one of said arm ends to one of said housings includes a transverse pin having a resilient sleeve, and
   f. the resilient means connecting the other of said ends to the other of said housings includes a resilient sleeve coaxial with said arm means.

7. A compactor as defined in claim 1, in which:
   e. the resilient means includes an inner sleeve, an outer sleeve and an intermediate sleeve of resilient material bonded between said inner and outer sleeves,
   f. the arm means includes a threaded member having spaced locking elements disposed thereon providing the adjustment means, and
   g. the inner sleeve is locked between said locking elements.

8. A compactor as defined in claim 1, in which:
   e. the arm means lies substantially on the center line between the drive and driven elements.

9. In a compactor:
   a. shoe means,
   b. carrier frame means resiliently mounted to the shoe means,
   c. vibrator means including:
      1. housing means mounted to the shoe means and including support means,
      2. vibration inducing shaft means mounted to the housing means and including a rotatable driven element,
   d. drive means including:
      1. housing means pivotally mounted to the carrier frame means,
      2. drive shaft means mounted to said housing means and including a rotatable drive element,
      3. a continuous flexible element extending between the drive element and the driven element in drive relation,
   e. means tensioning the flexible element including:
      1. arm means including length adjustment means disposed substantially on the center line between the drive and driven elements,
      2. pivot means pivotally mounting one end of the arm means to the drive housing means,
      3. resilient means mounting the other end of the arm means to the support means of the drive housing means.

10. A compactor as defined in claim 9, in which:
    f. the pivot means pivotally mounting one end of the arm to the drive housing means includes a pin transversely disposed of the arm means and provided with a resilient sleeve, and
    g. the resilient means mounting the other end of the arm to the support means of the drive housing means includes a sleeve of resilient material coaxially disposed of said arm means.

* * * * *